United States Patent Office 3,579,581 Patented May 18, 1971

1

3,579,581

PREPARATION OF QUATERNARY AMMONIUM HYDROXIDES

Jim N. Maloney, Jr., Pensacola, and Ralph W. Smith, Gulf Breeze, Fla., assignors to Monsanto Company, St. Louis, Mo.

No Drawing. Continuation-in-part of application Ser. No. 711,200, Mar. 7, 1968. This application Apr. 3, 1968, Ser. No. 718,362
Int. Cl. C07c *85/00*
U.S. Cl. 260—567.6 6 Claims

ABSTRACT OF THE DISCLOSURE

Quaternary ammonium hydroxides can be prepared in high yield and purity from quaternary ammonium salts in the aqueous residue from extraction of an olefinic nitrile electrohydrodimerization effluent by contacting at least a portion of the aqueous residue with a basic anion exchange resin.

CROSS-REFERENCE TO RELATED APPLICATION

This application is a continuation-in-part of our copending application Ser. No. 711,200 which was filed on Mar. 7, 1968 and is now abandoned.

BACKGROUND OF THE INVENTION

It is known that paraffinic dinitriles such as adiponitrile can be produced by electrohydrodimerization of olefinic nitriles such as acrylonitrile. In general, the reaction is carried out in the cathode compartment of an electrolytic cell having anode and cathode compartments separated by a cation permeable membrane. An aqueous solution containing at least one olefinic nitrile and a quaternary ammonium salt (generally a tetraalkylammonium sulfate, alkylsulfate, arylsulfonate or alkarylsulfonate) is circulated through the cathode compartment while an aqueous solution of a strong mineral acid such as sulfuric acid is circulated through the anode compartment. As electric current is passed through the solutions and the intermediate membrane, hydrogen ions from the anolyte permeate through the membrane into the cathode compartment and, in a reaction utilizing such hydrogen ions, the olefinic nitrile is dimerized at the cathode. General conditions under which the electrolysis can be suitably carried out are described in U.S. Pats. Nos. 3,193,481 and (with particular reference to the electrolytic hydrodimerization of acrylonitrile to adiponitrile) 3,193,480. The disclosures of those patents are incorporated herein by reference.

The dinitrile reaction product is withdrawn from the cell in the cathode compartment effluent which contains unreacted olefinic nitrile, the quaternary ammonium salt and impurities which normally include divalent sulfate ions from the anolyte, reaction byproducts such as propionitrile, bis-cyanoethylether and 3-hydroxypropionitrile, hydrolysis products thereof such as propionic, cyanovaleric and adipic acids and quaternary ammonium salts of such hydrolysis products. Economic operation of the electrohydrodimerization process requires not only an efficient technique for separation and purification of the dinitrile product but also a practical procedure for substantially complete recovery of the quaternary ammonium constituent in the cathode compartment effluent. It is known from U.S. Pat. No. 3,267,131 that most of the organic constituents of the cathode compartment effluent can be separated from the quaternary ammonium salt by extracting the effluent (preferably countercurrently) with an olefinic nitrile and water, e.g. with from about 0.1 to about 0.3 pound of the olefinic nitrile, being dimerized and from about 0.2 to about 0.5 pound of water per pound of the electrohydrodimerization effluent. However, substantially water-soluble impurities such as the aforementioned divalent sulfate ions, organic acids and quaternary ammonium salts thereof tend to accumulate in the quaternary ammonium salt-containing aqueous phase from such an extraction and adversely affect the yield of dinitrile when the salt so recovered is reused in the electrohydrodimerization process.

To overcome that problem, it has been found that the quaternary ammonium salt can be substantially purified of such water-soluble impurities by back-extracting the aqueous phase with an olefinic nitrile after lowering the water concentration thereof to not more than about 0.8 and preferably at least about 0.25 pound per pound of quaternary ammonium salt. Ordinarily, the water concentration is lowered to within that range by evaporation and the subsequent extraction is carried out with from about 2 to about 20 (preferably 8 to 12) pounds of acrylonitrile per pound of the concentrated aqueous phase.

Although the aforedescribed extraction of the concentrated aqueous phase provides an acrylonitrile phase containing most of the quaternary ammonium salt from the cathode compartment effluent and a very low concentration of water-soluble impurities, the aqueous residue from the extraction still contains substantial quaternary ammonium salt. Of course, the aqueous residue also contains a high proportion of water-soluble impurities such as divalent sulfate ions. In view of the significant value of the quaternary ammonium ions in that aqueous residue and in the absence of a satisfactory method for further physical separation of the divalent sulfate ions therefrom, a process for recovering the quaternary ammonium ions in a useful form is highly desirable, and it is an object of this invention to provide such a process.

SUMMARY OF THE INVENTION

It has now been discovered that a substantial proportion of the quaternary ammonium ions in the aqueous residue from extraction of the olefinic nitrile electrohydrodimerization effluent with acrylonitrile and water can be recovered in high yield and purity as quaternary ammonium hydroxides by contacting the aqueous residue or a substantial part thereof with a basic anion exchange resin. Thus, in generic scope, this invention provides a process for preparing a quaternary ammonium hydroxide which comprises contacting at least a portion of the aqueous residue from extraction of an olefinic nitrile electrohydrodimerization effluent containing a quaternary ammonium salt with a basic anion exchange resin.

DETAILED DESCRIPTION OF THE INVENTION

Although the process of this invention is applicable to any substantial portion or all of the aqueous phase from the extraction of a quaternary ammonium salt-containing olefinic nitrile electrohydrodimerization effluent with water, it is particularly useful in preparing a quaternary ammonium hydroxide from the impure quaternary ammonium ions that are present in the aqueous residue from extraction of the cathode compartment effluent by the aforedescribed steps of extraction with water and acrylonitrile, subsequent concentration and then back-extraction with acrylonitrile. The quaternary ammonium hydroxide thereby produced has a variety of important uses, for example in controlling the pH of the electrohydrodimerization catholyte, as a catalyst for decomposition of bis-cyanoalkylethers in the organic phase of the electrohydrodimerization effluent as described in U.S. Pat. No. 3,280,168, etc.

The quaternary ammonium compounds that are useful in the catholyte of the electrohydrodimerization process and which may be converted to quaternary ammonium hydroxides in accordance with the present invention include various salts of acids such as, for instance, sulfuric, sulfonic and phosphoric acids. Specific examples include the tetraalkylammonium sulfates, alkylsulfates, arylsulfonates, alkarylsulfonates, phosphates, and alkylphosphates, and particularly those in which each alkyl group contains one to four carbon atoms such as tetramethyl-, tetraethyl-, tetrapropyl-, tetrabutyl-, triethylmethyl- and trimethylethylammonium sulfate, methylsulfate, ethylsulfate, benzene sulfonate, toluene sulfonate, phosphate, methyl- and dimethylphosphate, ethyl- and diethylphosphate and methylethylphosphate. The invention is also applicable to mixtures of such salts which, because of their high water-solubility, are generally present in the aqueous phase in ionized form.

The anion exchange resin that is used in the practice of the process of this invention can be any of a variety of strongly basic anion exchangers, for example of the type which includes styrene divinylbenzene copolymers with hydroxide (e.g. quaternary ammonium hydroxide) substituents attached to the aromatic nuclei. In preferred embodiments, the hydroxylated substituents attached to the aromatic nuclei may have the structure

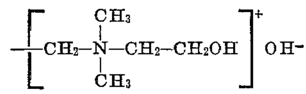

and the anion exchange resin may be one or more of those sold under the trademarks Dowex 1, Dowex 2, Dowex 11 and Dow 21K (Dow Chemical Co.), IRA-401 (Rohm and Haas Co.) and Permutit S1 and S2 (Permutit Co.). Other commercially available basic anion exchange resins of well known types may also be suitable, depending on the physical strength and regeneration characteristics of the particular resin.

For use in the present invention, the resin desirably contains at least about 0.7 milliequivalent of hydroxide per milliliter of resin. Initially, or after exhaustion in the present process, the resin may be brought to the desired level of basicity by contact with an aqueous solution of any suitable hydroxylated material. Solutions of alkali metal hydroxides such as sodium and potassium hydroxides are generally most suitable, and aqueous solutions containing 2% to 10% or more (preferably 4% to 8%) of such hydroxides are usually satisfactory. Ordinarily, the resin is best regenerated by passing the alkali metal hydroxide solution through the resin bed, preferably in a direction countercurrent to the direction of normal salt solution flow and generally at a flow rate of two to three gallons per minute per square foot of cross-sectional area of the bed.

In normal continuous operation, the aqueous residue is diluted to a water concentration of at least about 50% (preferably at least about 67%) by weight and the resulting salt solution is passed through the resin bed at any temperature at which the resin is stable, for example up to 50° C. or higher and normally between about 15° and about 40° C., most desirably in a downward direction and at a rate of not more than about three gallons per minute per square foot of cross-sectional area of the bed. The anion exchange is advantageously carried out with acidity measurements of the effluent from the bed so as to avoid exceeding a predetermined maximum concentration of divalent sulfate ion. When the highest tolerable level of divalent sulfate ion is approached, the salt solution flow may be diverted to a second resin bed while the first is regenerated, preferably after displacing the salt solution from the first bed with water (e.g. 1 to 2 times the bed volume) and then loosening the resin with a stream of water passed countercurrent to the previous flow of salt solution (desirably until a bed expansion of about 100% is achieved). One or more volumes of water per volume of the resin may be necessary to accomplish the desired expansion. Reloosening of the resin after regeneration may also be desirabel.

After resin exhaustion and regeneration, the effluent from the bed generally contains a higher divalent sulfate ion concentration due to fouling of the resin by impurities and, in that case, it may be advantageous to defoul the exhausted resin, for example by passing a stream of dilute (e.g. 5%) sulfuric acid through the bed just prior to the regeneration step. Several bed volumes of the dilute acid after 5–10 cycles of exhaustion and regeneration are usually sufficient to markedly decrease the concentration of undesirable divalent sulfate ions in the subsequent quaternary ammonium hydroxide effluent. Excess defoulant should be removed, e.g. by water washing, before beginning the regeneration step.

When carried out as described herein, the process of this invention is effective in converting a very high proportion of the quaternary ammonium ions in the aqueous residue from extraction of the electrohydrodimerization effluent to the desired quaternary ammonium hydroxide form and with an exceptionally low concentration of the undesirable divalent sulfate ions. For example, as much as 90% or more of the tetraethylammonium ions from a diluted aqueous residue containing about 25% tetraethylammonium ethylsulfate and about 7% divalent sulfate ions have been recovered as tetraethylammonium hydroxide containing divalent sulfate ions in a concentration corresponding to only 0.013 pound of sulfur per pound of tetraethylammonium hydroxide. The following examples are included to illustrate the use of the process of this invention for producing a quaternary ammonium hydroxide by contacting such a solution of quaternary ammonium ions with a basic anion exchange resin, and are not intended to represent any limitation of the scope of the invention. Percentages are by weight except where noted otherwise.

EXAMPLE I

An acrylonitrile electrohydrodimerization cathode compartment effluent containing about 15% adiponitrile, 15% acrylonitrile, 39% tetraethylammonium ethylsulfate, 29% water and 2% impurities including divalent sulfate ions was filtered and then countercurrently extracted with 0.25 pound of acrylonitrile and 0.35 pound of water per pound of the effluent to remove substantially all of the adiponitrile therefrom. The aqueous phase from the extraction was substantially completely stripped of acrylonitrile and concentrated by evaporation to provide an aqueous mixture which contained 62.3% tetraethylammonium ethylsulfate and 3.86% divalent sulfate ions. The concentrated aqueous mixture was then back-extracted with acrylonitrile containing 3.8% water in the amount of 10 volumes of the wet acrylonitrile per volume of tetraethylammonium ethylsulfate in the mixture. The aqueous residue therefrom containing 3.4% of the tetraethylammonium ethylsulfate and 84% of the divalent sulfate ion from the concentrated aqueous mixture was substantially completely stripped of acrylonitrile and then diluted to a water concentration of 67%. 650 milliliters of the resulting salt solution containing 20.6% tetraethylammonium ion, 2.12% ethylsulfate ion and 6.7% divalent sulfate ion was passed at the rate of 16 milliliters per minute through a 1.825 inch I.D. glass column containing 1600 milliliters of Dowex 1, a styrene divinylbenzene copolymer anion exchange resin. The resin had been rendered strongly basic by contact with 6400 milliliters of 8% sodium hydroxide at the rate of 80 milliliters per minute. After passage of the diluated salt solution through the column, the resin was washed with water at 16 milliliters per minute until the concentration of hydroxide ion in the effluent decreased sharply. From analysis of the combined effluents from the column, it was found that 91% of the tetraethylammonium ion in the diluted salt solution had been converted to tetraethylammonium hydroxide (8.27 pounds of tetraethylammonium hydroxide per cubic foot of resin) containing 0.013 pound of sulfur per pound of dry tetraethylammonium hydroxide.

EXAMPLE II

When the procedure of Example I was repeated with the exception that the diluted salt solution and the wash water were passed through the column at the rate of 5 milliliter per minute and 80 milliliters per minute, respectively, 67.2% of the tetraethyl ammonium ion in the diluted salt solution was converted to tetraethylammonium hydroxide (7.24 pounds of tetraethylammonium hydroxide per cubic foot or resin) containing 0.0105 pound of sulfur per pound of dry tetraethylammonium hydroxide.

We claim:

1. A process which comprises extracting an acrylonitrile electrohydrodimerization effluent containing a tetra($C_1$–$C_4$ alkyl)ammonium salt selected from the group consisting of sulfate, $C_1$–$C_4$ alkylsulfate, benzenesulfonate, toluenesulfonate, phosphate and $C_1$–$C_4$ alkylphosphate with water and acrylonitrile to provide a nitrile phase and an aqueous phase containing a major portion of the tetraalkylammonium salt from said effluent; lowering the water concentration in said aqueous phase to below about 0.8 pound per pound of the tetraalkylammonium salt in said aqueous phase; extracting the concentrated aqueous phase with acrylonitrile to provide an organic phase containing a major portion of the tetraalkylammonium salt and an aqueous residue containing the remainder of the salt from the concentrated aqueous phase; separating substantially all acrylonitrile from the aqueous residue; thereafter increasing the water concentration of the aqueous residue to at least about 50% by weight; contacting the aqueous residue of increased water concentration with a basic anion exchange resin in hydroxide form; and washing the resin to recover the resulting tetra($C_1$–$C_4$ alkyl)ammonium hydroxide.

2. A process as defined in claim 1, in which the anion exchange resin is a hydroxylated styrene-divinylbenzene copolymer.

3. A process as defined in claim 1, in which the anion exchange resin contains at least about 0.7 milliequivalent of hydroxide per milliliter of resin.

4. A process as defined in claim 1, in which the electrohydrodimerization effluent is extracted with from about 0.2 to about 0.5 pound of water and from about 0.1 to about 0.3 pound of the acrylonitrile per pound of said effluent.

5. A process as defined in claim 1, in which the concentrated aqueous phase is extracted with from about 2 to about 20 pounds of acrylonitrile per pound of the concentrated aqueous phase.

6. A process as defined in claim 1, in which the tetraalkylammonium salt is tetraethylammonium ethylsulfate.

References Cited

UNITED STATES PATENTS

| | | | |
|---|---|---|---|
| 3,335,162 | 8/1967 | Campbell et al. ---- | 260—567.6 |
| 3,267,131 | 8/1966 | Campbell et al. ---- | 260—465.1 |

FOREIGN PATENTS

| | | | |
|---|---|---|---|
| 695,968 | 8/1953 | Great Britain ------ | 260—567.6 |

OTHER REFERENCES

Calmon et al.: Ion Exchangers in Organic and Biochemistry, Interscience Pub., Inc., New York, N.Y., p. 118 (1957).

BERNARD HELFIN, Primary Examiner

M. W. GLYNN, Assistant Examiner

U.S. Cl. X.R.

260—465.8